(12) United States Patent
Mene et al.

(10) Patent No.: US 12,022,564 B2
(45) Date of Patent: Jun. 25, 2024

(54) DYNAMIC EMBEDDED-SIM CONFIGURATION

(71) Applicant: International Business Machines Corporation, Armonk, NY (US)

(72) Inventors: Atul Mene, Morrisville, NC (US); Natalie Brooks Powell, Bolingbrook, IL (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/336,501

(22) Filed: Jun. 2, 2021

(65) Prior Publication Data

US 2022/0394457 A1 Dec. 8, 2022

(51) Int. Cl.
*H04W 8/18* (2009.01)
(52) U.S. Cl.
CPC ..................... *H04W 8/18* (2013.01)
(58) Field of Classification Search
CPC ........................................ H04W 8/18
USPC ........................................ 455/418
See application file for complete search history.

(56) References Cited

U.S. PATENT DOCUMENTS

| 9,628,981 | B2 | 4/2017 | Park |
| 10,021,558 | B2 | 7/2018 | Lalwaney |
| 10,827,331 | B1 | 11/2020 | Chastain |
| 2020/0037153 | A1 | 1/2020 | Anand |
| 2020/0322884 | A1* | 10/2020 | Di Girolamo ........ H04W 12/37 |
| 2022/0038979 | A1* | 2/2022 | Bongaarts ............. H04W 8/183 |
| 2022/0070699 | A1* | 3/2022 | Thiyagarajan ........ H04W 24/04 |

FOREIGN PATENT DOCUMENTS

| CN | 105376819 B | 3/2016 |
| CN | 105873013 B | 8/2016 |
| CN | 105916134 B | 8/2016 |
| CN | 106376044 A | 2/2017 |

(Continued)

OTHER PUBLICATIONS

"eSIM Industry Landscape 2020", Press release, Jun. 22, 2020, 2 pages, <https://www.openpr.com/news/2077641/esim-industry-landscape-2020>.

(Continued)

*Primary Examiner* — Ahmad F. Matar
*Assistant Examiner* — Jirapon Tulop
(74) *Attorney, Agent, or Firm* — Brian M. Restauro

(57) ABSTRACT

Embodiments of the present invention provide computer-implemented methods, computer program products, and computer systems. Embodiments of the present invention can dynamically determine an optimal embedded subscriber identification module (eSIM) configuration of respective edge devices connected to a network. Embodiments of the present invention can then dynamically change a data plan associated with the eSIM of respective edge devices connected to the network such that activity can be executed with required quality by the respective edge devices based on contextual need of data processing, volume of data transfer, and speed of data transfer among the respective edge devices.

17 Claims, 4 Drawing Sheets

(56) References Cited

FOREIGN PATENT DOCUMENTS

CN 110324808 A 10/2019
EP 3817418 A1 * 5/2021 .............. H04W 4/24

OTHER PUBLICATIONS

"Who is set to benefit from eSIM technology?", IoT Now News, Dec. 13, 2018, 8 pages, <https://www.iot-now.com/2018/12/13/91229-set-benefit-esim-technology/>.
Disclosed Anonymously, "Enterprise Security Identify Module (Sim)", An IP.com Prior Art Database Technical Disclosure, IP.com No. IPCOM000130386D, IP.com Electronic Publication Date: Oct. 25, 2005, 2 pages.

* cited by examiner

DYNAMIC EMBEDDED-SIM CONFIGURATION

BACKGROUND

The present invention relates in general to embedded eSIM configuration and in particular to dynamic eSIM configuration based on context of edged processing with defined service level agreements.

An embedded-SIM (eSIM) is a form of programmable subscriber identification module SIM card that is embedded directly into a device. This improves reliability and network security, while also reducing space requirements, since a relatively bulky connector is no longer needed, increasing design flexibility. An eSIM can be provisioned remotely that is, end-users can add or remove operators without the need to physically swap a SIM from the device. Networking solutions using eSIM technology can be widely applicable to various Internet of Things (IoT) scenarios, including connected cars (e.g., smart rearview mirrors, on-board diagnostics (OBD), vehicle Wi-Fi hotspots), artificial intelligence translators, MiFi devices, smart earphones, smart metering, GPS tracking units, bike-sharing, video capturing devices, etc.

Wearable technology are smart electronic devices (e.g., electronic device with micro-controllers) that are worn close to or on the surface of a user's skin. Wearable devices can detect, analyze, and transmit information concerning (e.g., body signals such as vital signs, and ambient data) which allow in some cases immediate biofeedback to the wearer. Wearable devices such as activity trackers are an example of the Internet of Things (IoT) such as electronics, software, sensors, and connectivity are effectors that enable objects to exchange data (including data quality) through the internet with a manufacturer, operator, and other connected devices, without requiring human intervention.

SUMMARY

According to an aspect of the present invention, there is provided a computer-implemented method. The computer implemented method comprises: dynamically determining an optimal embedded subscriber identification module (eSIM) configuration of respective edge devices connected to a network; and dynamically changing a data plan associated with the eSIM of respective edge devices connected to the network such that activity can be executed with required quality by the respective edge devices based on contextual need of data processing, volume of data transfer, and speed of data transfer among the respective edge devices.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize limitations of edge computing systems. Specifically, in typical edge computing ecosystem, devices communicate with each other and execute edge computation. The data processing needs changes from time to time (e.g., volume of data to be processed, speed of processing etc.). As such device-to-device communication capability also needs to change. This can lead to certain inefficiencies. For examples, devices that may be idle yet still have a data plan. As such embodiments of the present invention provide improvements to edge computing systems by providing dynamic eSIM provisioning. Specifically, embodiments of the present invention recognize the need to provision resources for data transfer based on contextual and volume of data processing need, based on one or more edge devices connected to an ecosystem.

Figure 1:
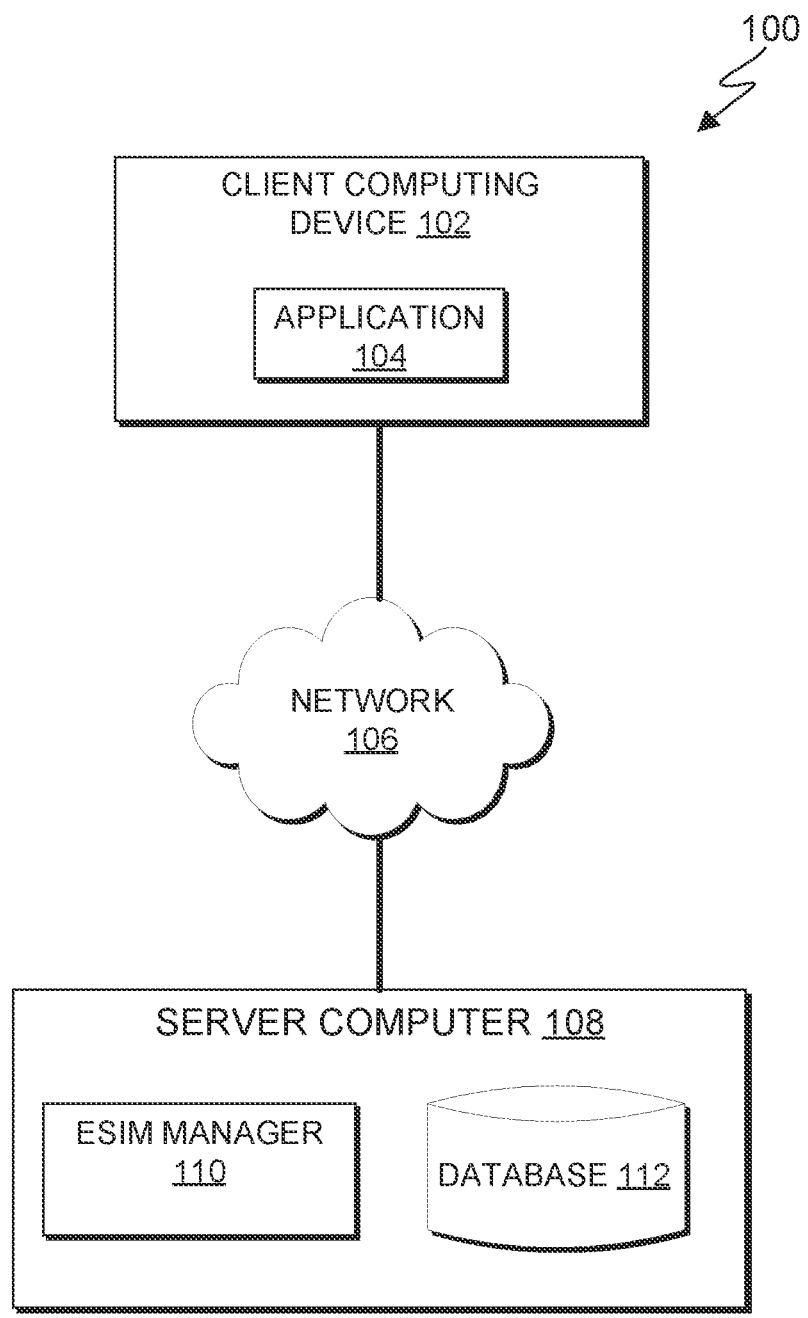
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access eSIM manager 110 (e.g., using TCP/IP) to access content, user information, and database information. Application 104 can further communicate with eSIM manager 110 dynamically configuring one or more eSIMs associated with respective devices to complete edge computing needs in edge computing systems as discussed in greater detail with respect to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts eSIM manager 110 and database 112. In this embodiment, eSIM manager 110 resides on server computer 108. In other embodiments, eSIM manager 110 can have an instance of the program (not shown) stored locally on client computer device 102. In other embodiments, eSIM manager 110 can be a standalone program or system that detects and creates visualizations of the detected event. In yet other embodiments, eSIM manager 110 can be stored on any number or computing devices.

ESIM manager 110 dynamically configures one or more eSIMs associated with respective devices to complete edge computing needs in edge computing systems. For example, eSIM manager 110 can dynamically configure eSIMs of respective devices to meet service level agreements (SLAs) such as duration, speed, etc. In some embodiments, eSIM manager 110 can detect connection to a network that eSIM manager 110 supports. For example, eSIM manager 110 can detect new devices connecting to a network (e.g., edge computing system). In response to detecting new devices connecting to the network, eSIM manager 110 can identify eSIMS of those new devices and configure them as well to facilitate completion of a processing task.

In some embodiments, eSIM manager 110 can also modify data plans associated with eSIMs of respective devices. For example, eSIM manager 110 can modify data plans based on contextual need of edge processing, parallel data processing and transmission. In this embodiment, eSIM manager 110 can modify data plans by identifying current data plans associated with respective eSIMs, determine an optimal data plan that satisfies processing requirements, and select a data plan that optimizes processing at an optimal cost. For example, eSIM manager 110 can identifying a current data plan, identify processing requirements and determine the need to increase the data plan to meet processing requirements. ESIM manager 110 can then identify costs associated with data plans that will satisfy processing requirements and select a data plan that fits a user's requirements (e.g., budget) as discussed in greater detail with regard to FIGS. 2-4.

In this embodiment, eSIM manager 110 can dynamically reconfigure eSIMs of respective devices during a processing task. For example, while any edge computing device is in progress, eSIM manager 110 can reconfigure the eSIM of the respective devices including necessary adjustments such as a higher data plan or lower data plan of the participating devices, pay per use or shared pricing plans so that the cost of edge processing can be minimized while maintaining the required SLA.

In other embodiments, eSIM manager 110 can be configured to work with or otherwise utilize a distributed ledger system to track actions taken by eSIM manager 110. For example, eSIM manager 110 can utilize a distributed ledger system to track when the eSIM is configured, how long (i.e., length of time) devices have participated in the edge computing, and which devices are involved so that appropriate cost can be calculated in an immutable chain.

Database 112 stores received information and can be representative of one or more databases that give permissioned access to eSIM manager 110 or publicly available databases. For example, database 112 can store received information and changes to eSIMs of respective devices. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
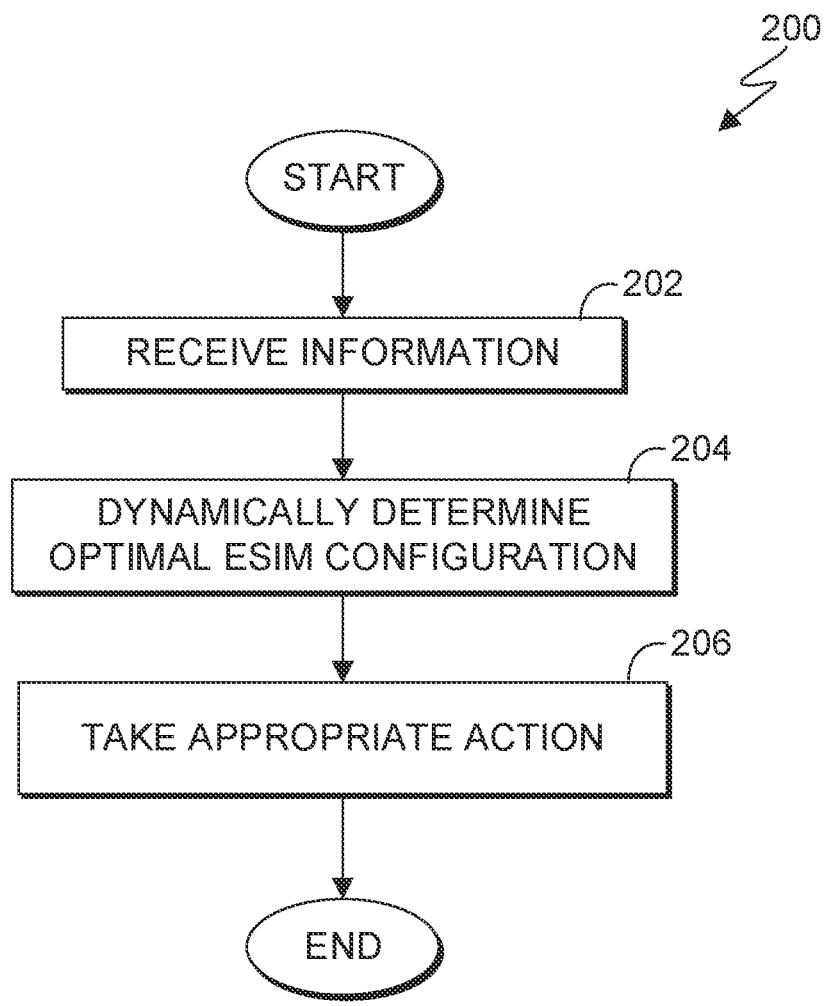
FIG. 2 is a flowchart depicting operational steps for dynamically reconfiguring an eSIM, in accordance with an embodiment of the present invention.

FIG. 2 is a flowchart 200 depicting operational steps for dynamically reconfiguring an eSIM, in accordance with an embodiment of the present invention.

In step 202, eSIM manager 110 receives information. In this embodiment, eSIM manager 110 receives a request from client computing device 102 to register for the services of eSIM manager 110. For example, eSIM manager 110 can receive requests from one or more Internet of Things (IoT) devices (e.g., machines, robots, moving or non-moving machines, smart watch, mobile devices, certain Internet of Things (IoT) connected devices such as a smart clothing, fitness trackers, etc.) to connect to a network (e.g., edge processing network). In this way, eSIM manager 110 can monitor connections to and disconnections from an associated network. In response to receiving a request to an subsequent successful connection to the network, eSIM manager 110 can further monitor data transfer requirements between connected devices. In other embodiments, eSIM manager 110 can receive information from one or more other components of computing environment 100.

Information received by eSIM manager 110 can also include received service level agreements (SLAs). For example, eSIM manager 110 can receive or otherwise identify the following information from SLAs: type of service to be provided (e.g., in IP network connectivity, type of service will describe functions such as operation and maintenance of networking equipment, connection bandwidth to be provided, etc.), desired performance level (e.g., reliability and responsiveness, that is, one that suffers minimum disruption in a specific amount of time and is available at almost all times), monitoring process and service level reporting (e.g., how the performance levels are supervised and monitored including gathering different type of statistics, how frequently these statistics will be collected and how they will be accessed by the customers), reporting mechanisms (e.g., specifying the contact details to report the problem to and the order in which details about the issue have to be reported along with a timeframe to resolve the issue), and repercussions for service provider not meeting its commitment (e.g., customer's right to terminate the contract or ask for a refund for losses incurred by the customer due to failure of service).

In some embodiments, eSIM manager 110 can receive other user specified information. For example, eSIM manager 110 can receive information regarding current data plans that eSIMs connected to the network have, user preference for spending, user authorizations to make changes to eSIM data plans, user limits to authorizations to make changes, etc.

Regardless of the received information, eSIM manager 110 can continually gather and store received information to build a historical corpus to reference. For example, eSIM manager 110 can include different contextual situations, amount of data processing, time required to complete a specific type of request, device to device capabilities, etc.

In step 204, eSIM manager 110 dynamically determines an optimal eSIM configuration. In this embodiment, eSIM manager 110 dynamically determines an optimal eSIM configuration by identifying context of a processing task, predicting data volume associated with the processing task, retrieving service level requirements, and optimizing eSIM configuration based on the context of the processing task, predicted data volume, and service level requirements as discussed in greater detail with regard to FIG. 3.

In step 206, eSIM manager 110 takes appropriate action. In this embodiment, eSIM manager 110 takes appropriate action by configuring or reconfiguring an eSIM of a respective device connected to the network.

For example, prior to connecting to the network, four edge devices (e.g., device A, device B, device C, and device D) can have respective eSIMs (e.g., eSIM, eSIM 2, eSIM 3, and eSIM 4). In this example, eSIMs 1-4 each have an infinite data plan and has a transmission rate of 1 gbps on a digital data transmission medium such as optical fiber. eSIM manager 110 identifies this as example as having a standard SLA, with standard fixed cost and high overhead (e.g., wasted capacity across all the edge devices).

After performing the methodology of flowchart 200, and specifically flowchart 300, discussed in greater detail later in this Specification, eSIM manager 110 can provide a dynamic reduction of data plans that can still satisfy service level agreements during processing inclusive of all edge devices connected to the network. Continuing the above example, eSIM manager 110 can reconfigure device A to function at a transmission rate and corresponding data plan of 300 mbps, device B to have a transmission rate of 100 mbps, device C to have a transmission rate and respective data plan of 200 mbps, and device D to have a transmission rate of 300 mbps and according data plan. As such, the data plan and associated cost to operate is reduced from 1 gbps. In this manner eSIM manager 110 can automatically and dynamically configure eSIMs of corresponding devices to optimize the cost and thus have reduced the cost of the Dynamic SLA to react to the actual and predicted future usage of data utilization of the network connection.

In some embodiments, eSIM manager 110 can continue monitoring a processing task and dynamically reconfiguring an eSIM of one or more respective devices during a processing task to the optimal eSIM configuration.

Figure 3:
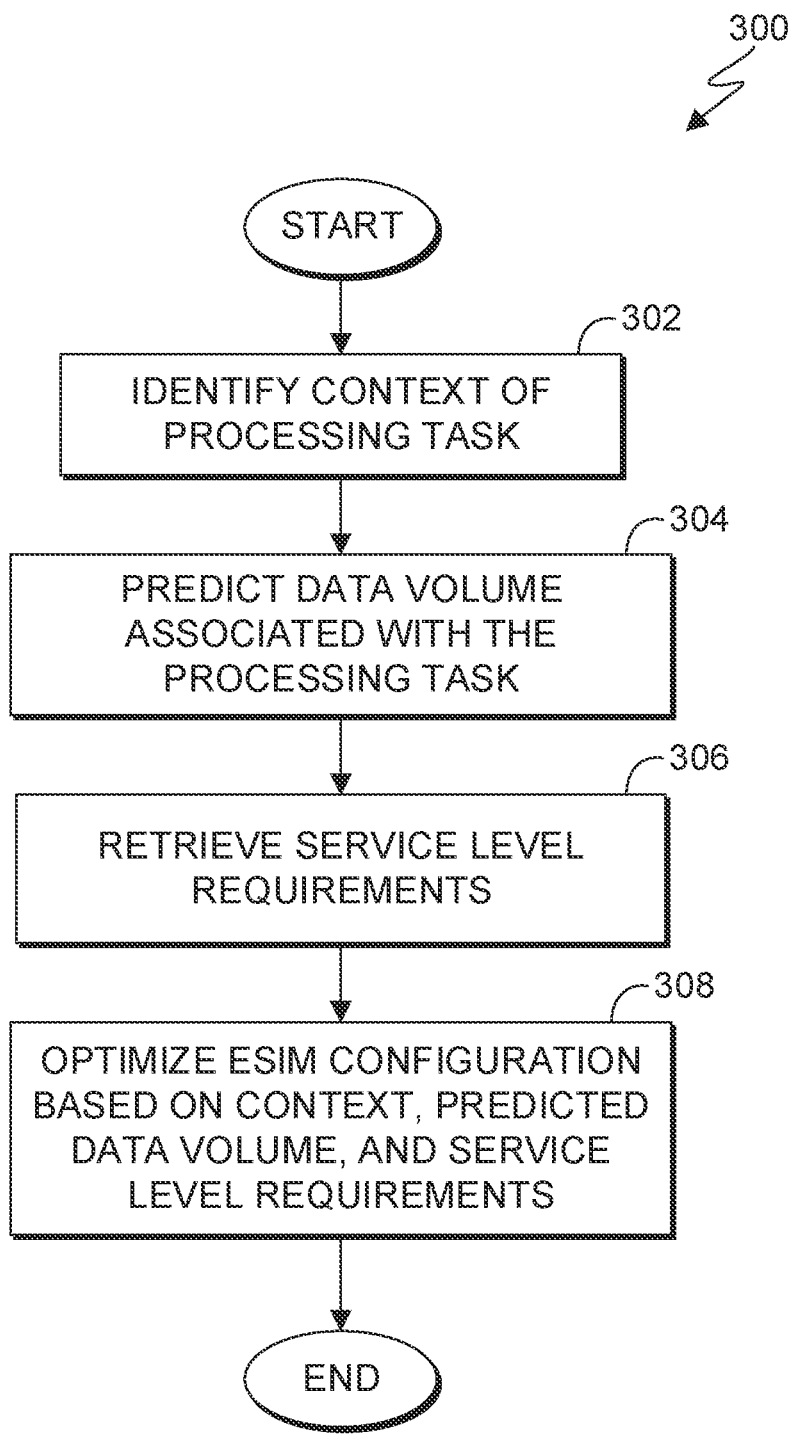
FIG. 3 is a flowchart depicting operational steps for dynamically determining an optimal eSIM configuration, in accordance with an embodiment of the present invention.

FIG. 3 is a flowchart 300 depicting operational steps for dynamically determining an optimal eSIM configuration, in accordance with an embodiment of the present invention.

In step 302, eSIM manager 110 identifies context of a processing task. In this embodiment, eSIM manager 110 identifies context of a processing task using one or more machine learning, natural language processing, and artificial intelligence algorithms. In this embodiment, eSIM manager 110 can utilize sensor input received from one or more connected devices to identify context. In other embodiments, eSIM manager 110 can receive a context of a processing task from the user.

In this embodiment, context can refer to types of computing tasks. For example, context can include types of processing: transaction, distributed processing, real-time processing, batch processing. Context can also refer to a priority associated with the task. In general, context can refer to material information that can affect a processing task (e.g., data transfer speeds, an accident, material movement, etc.). Context can also refer to one or more requirements to process the task. For example, in some embodiments, context can include requirements from a service level agreement (SLA).

In step 304, eSIM manager 110 predicts data volume associated with the processing task. In this embodiment, eSIM manager 110 predicts data volume associated with the processing task based, at least in part on the cycles of edge computing, time to complete a task based on historical data associated with similar tasks and related data transfer rates, and service level requirements. In this embodiment, eSIM manager 110 can leverage one or more machine learning algorithms and artificial intelligence algorithms to predict data volume associated with the processing task. In other embodiments, eSIM manager 110 can use pattern analysis using stored historical information associated with similar processing tasks (e.g., type of request, actions performed to complete the request, device hardware and software capabilities, etc.). For example, eSIM manager 110 can identify requirements of the processing task, compare the requirements to a stored database comprising previously completed processing task and identify similar processing tasks. ESIM manager 110 can then identify data volume associated with the similar processing tasks and use that as the prediction for the received processing task. In certain embodiments, eSIM manager 110 can account for extenuating circumstances to adjust the prediction (e.g., to increase or lower the data volume prediction).

In step 306, eSIM manager 110 retrieves service level requirements. In this embodiment, eSIM manager 110 retrieves service level requirements from database 112. For example, eSIM manager 110 can retrieve service level requirements for various Internet Service providers. ESIM manager 110 can then identifying different data plans of respective Internet Service providers, associated costs (e.g., pricing), associated data transfer speed, amount of data consumption, etc. In other embodiments, eSIM manager 110 can receive service level requirements from one or more devices connected to the network. In yet other embodiments, eSIM manager 110 can query one or more systems to transmit service level requirements.

In step 308, eSIM manager 110 optimizes eSIM configuration of a connected device. In this embodiment, eSIM manager 110 optimizes eSIM configuration of a connected device by determining an optimal data plan based, at least in part on context, predicted data volume, and service level agreements. For example, eSIM manager 110 a number of connected devices to process the received task, can retrieve data plans of service providers, and compare those data plans to identify a data plan that would satisfy requirements of the SLA and the predicted data volume.

ESIM manager 110 can then use one or more optimization algorithms to determine which data plan to select for each connected device such that each connected device only uses the data plan required to complete the task. In some embodiments, eSIM manager 110 can optimize the data plans to apportion costs between each of the connected device. In other embodiments, eSIM manager 110 can vary identified data plans for respective eSIMs of connected devices. For example, eSIM manager 110 can, before optimizing eSIM configuration, take into account any newly connected device to the network before making its optimization. In certain embodiments, based on the progress of the edge computing, eSIM manager 110 can also dynamically control the eSIM (e.g., increasing, decreasing, withdrawing data plan in any device).

Figure 4:
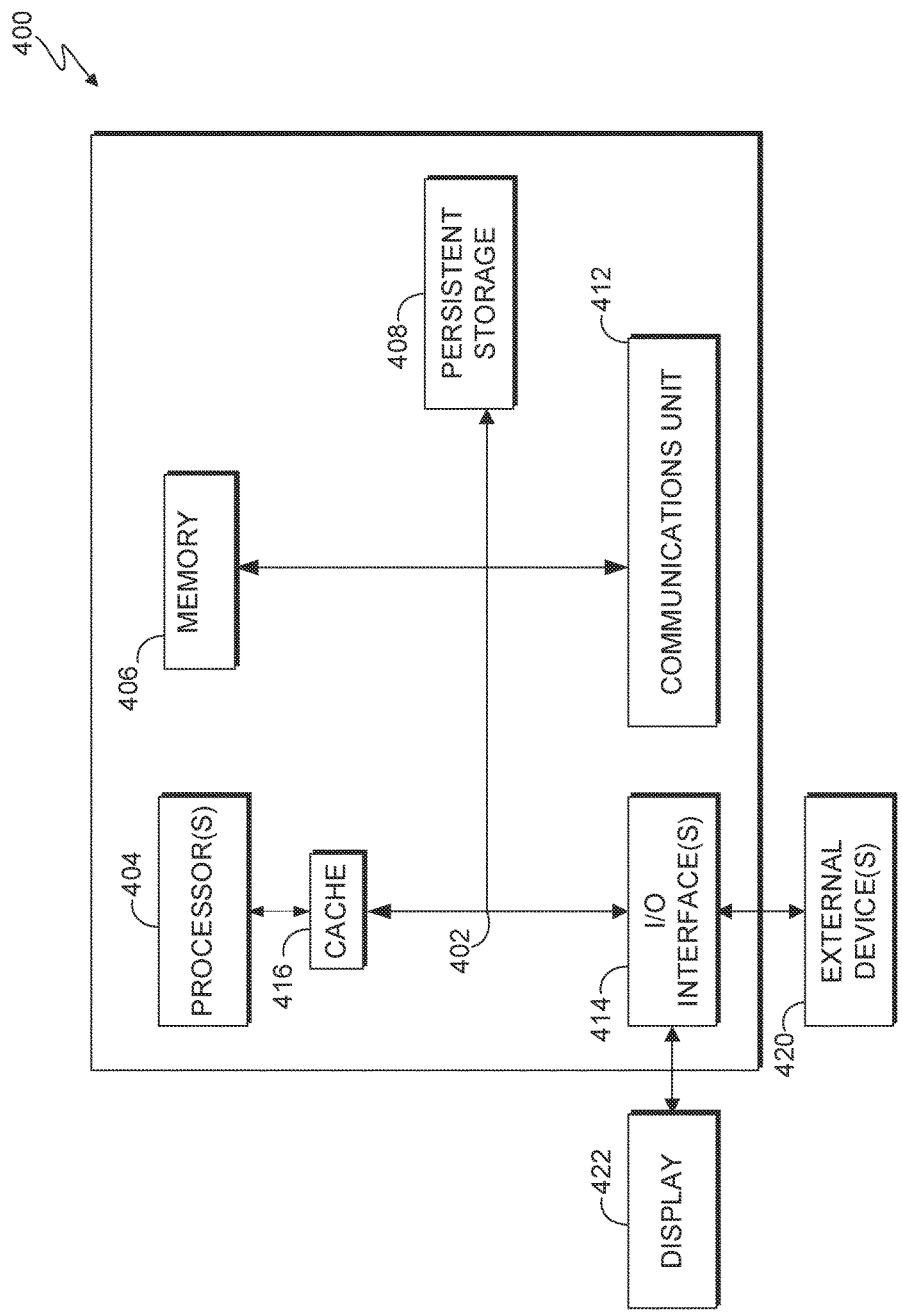
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

ESIM manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. ESIM manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., eSIM manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   dynamically determining an optimal embedded subscriber identification module (eSIM) configuration of respective edge devices interconnected via a network by:
      identifying a context associated with a received processing task for edge processing, and
      predicting a data volume associated with the received processing task for edge processing based on the identified context, and
      apportioning processing responsibilities between the respective edge devices based on the identified context, predicted data volume, and speed of data transfer among the respective edge devices such that the received processing task is processed between the respective edge devices; and
   dynamically changing transmission rates of the eSIM of respective edge devices connected to the network during the processing task such that activity can be executed with required quality by the respective edge devices based on the dynamically determined optimal embedded subscriber identification (eSIM) configuration.

2. The computer-implemented method of claim 1, further comprising:
   increasing or decreasing the data plan based on an identified context for edge processing and service level agreements requirements.

3. The computer-implemented method of claim 2, further comprising:
   reconfiguring eSIM configuration of respective edge devices based, at least in part, on a change in data requirements for a received processing task.

4. The computer-implemented method of claim 3, wherein reconfiguring eSIM configuration of respective edge devices based, at least in part, on a change in data requirements for the received processing task comprises:
   identifying a new edge device connecting to the network;
   apportioning processing of the received task to include the identified new edge device; and
   reconfiguring eSIM configuration of respective edge devices based on device capabilities of the identified new edge device.

5. The computer-implemented method of claim 1, wherein identifying a context associated with a received processing task for edge processing comprises: determining contextual need of edge processing based, at least in part, on historical analysis of edge processing need.

6. The computer-implemented method of claim 1, further comprising:
   tracking length of time respective edge devices have participated in edge computing using a distributed ledger system.

7. A computer program product comprising:
   one or more computer readable storage media and program instructions stored on the one or more computer readable storage media, the program instructions comprising:
   program instructions to dynamically determine an optimal embedded subscriber identification module (eSIM) configuration of respective edge devices interconnected via a network by:
      identifying a context associated with a received processing task for edge processing, and
      predicting a data volume associated with the received processing task for edge processing based on the identified context, and
      apportioning processing responsibilities between the respective edge devices based on the identified context, predicted data volume, and speed of data transfer among the respective edge devices such that the received processing task is processed between the respective edge devices; and
   program instructions to dynamically change rates of the eSIM of respective edge devices connected to the network during the processing task such that activity can be executed with required quality by the respective edge devices based on the dynamically determined optimal embedded subscriber identification (eSIM) configuration.

8. The computer program product of claim 7, wherein the program instructions stored on the one or more computer readable storage media further comprise:
   program instructions to increase or decrease the data plan based on an identified context for edge processing and service level agreements requirements.

9. The computer program product of claim 8, wherein the program instructions stored on the one or more computer readable storage media further comprise:
   program instructions to reconfigure eSIM configuration of respective edge devices based, at least in part, on a change in data requirements for a received processing task.

10. The computer program product of claim 9, wherein the program instructions to reconfigure eSIM configuration of respective edge devices based, at least in part, on a change in data requirements for the received processing task comprise:
   program instructions to identify a new edge device connecting to the network;
   program instructions to apportion processing of the received task to include the identified new edge device; and
   program instructions to reconfigure eSIM configuration of respective edge devices based on device capabilities of the identified new edge device.

11. The computer program product of claim 7, wherein the program instructions to identify a context associated with a received processing task for edge processing comprise:
   program instructions to determine contextual need of edge processing based, at least in part, on historical analysis of edge processing need.

12. The computer program product of claim 7, wherein the program instructions stored on the one or more computer readable storage media further comprise:
   program instructions to track length of time respective edge devices have participated in edge computing using a distributed ledger system.

13. A computer system comprising:
   one or more computer processors;
   one or more computer readable storage media; and
   program instructions stored on the one or more computer readable storage media for execution by at least one of the one or more computer processors, the program instructions comprising:
   program instructions to dynamically determine an optimal embedded subscriber identification module (eSIM) configuration of respective edge devices interconnected via a network by:
      identifying a context associated with a received processing task for edge processing, and
      predicting a data volume associated with the received processing task for edge processing based on the identified context, and
      apportioning processing responsibilities between the respective edge devices based on the identified context, predicted data volume, and speed of data transfer among the respective edge devices such that the received processing task is processed between the respective edge devices; and
   program instructions to dynamically change rates of the eSIM of respective edge devices connected to the network during the processing task such that activity can be executed with required quality by the respective edge devices based on the dynamically determined optimal embedded subscriber identification (eSIM) configuration.

14. The computer system of claim 13, wherein the program instructions stored on the one or more computer readable storage media further comprise:
   program instructions to increase or decrease the data plan based on an identified context for edge processing and service level agreements requirements.

15. The computer system of claim 14, wherein the program instructions stored on the one or more computer readable storage media further comprise:
   program instructions to reconfigure eSIM configuration of respective edge devices based, at least in part, on a change in data requirements for a received processing task.

16. The computer system of claim 15, wherein the program instructions to reconfigure eSIM configuration of respective edge devices based, at least in part, on a change in data requirements for the received processing task comprise:
   program instructions to identify a new edge device connecting to the network;
   program instructions to apportion processing of the received task to include the identified new edge device; and
   program instructions to reconfigure eSIM configuration of respective edge devices based on device capabilities of the identified new edge device.

17. The computer system of claim 13, wherein the program instructions to identify a context associated with a received processing task for edge processing comprise:
   program instructions to determine contextual need of edge processing based, at least in part, on historical analysis of edge processing need.

* * * * *